(12) United States Patent
McKinney

(10) Patent No.: US 11,278,091 B1
(45) Date of Patent: Mar. 22, 2022

(54) UMBRELLA REPAIR ASSEMBLY

(71) Applicant: Jason McKinney, Farmington Hills, MI (US)

(72) Inventor: Jason McKinney, Farmington Hills, MI (US)

(*) Notice: Subject to any disclaimer, the term of this patent is extended or adjusted under 35 U.S.C. 154(b) by 0 days.

(21) Appl. No.: 17/066,020

(22) Filed: Oct. 8, 2020

(51) Int. Cl.
A45B 25/18 (2006.01)
F16B 2/18 (2006.01)

(52) U.S. Cl.
CPC .............. A45B 25/18 (2013.01); F16B 2/18 (2013.01)

(58) Field of Classification Search
CPC ...................................... A45B 25/18
USPC ...................................... 135/33.5
See application file for complete search history.

(56) References Cited

U.S. PATENT DOCUMENTS

| 321,855 | A | * | 7/1885 | Richards | A45B 25/18 |
| | | | | | 135/33.5 |
| 728,035 | A | * | 5/1903 | Sprague | A45B 25/18 |
| | | | | | 135/33.5 |
| 880,534 | A | | 3/1908 | Hoyt | |
| 988,904 | A | * | 4/1911 | Sprague | A45B 25/18 |
| | | | | | 135/33.5 |
| 1,336,218 | A | | 4/1920 | Goldstein | |
| 1,591,880 | A | * | 7/1926 | Ornstein | A45B 25/18 |
| | | | | | 135/33.5 |
| 2,533,799 | A | * | 12/1950 | Haydu | A45B 25/18 |
| | | | | | 24/575.1 |
| 2,591,095 | A | * | 4/1952 | Ornstein | A45B 25/18 |
| | | | | | 135/33.5 |
| 3,000,387 | A | | 9/1961 | Tibony | |
| 4,089,416 | A | | 5/1978 | Sims | |
| 4,633,894 | A | | 1/1987 | Okuda | |
| 5,068,955 | A | | 12/1991 | Gonet | |
| 5,101,844 | A | * | 4/1992 | Morrone | A45B 25/18 |
| | | | | | 135/33.5 |
| 5,564,450 | A | * | 10/1996 | Sokoloski | A45B 25/18 |
| | | | | | 135/33.2 |
| D506,188 | S | | 6/2005 | Heeda | |
| 7,992,581 | B2 | * | 8/2011 | Hoogendoorn | A45B 19/00 |
| | | | | | 135/31 |
| 2006/0284413 | A1 | | 12/2006 | Barrera | |

FOREIGN PATENT DOCUMENTS

GB 161800 4/1921

* cited by examiner

Primary Examiner — Noah Chandler Hawk

(57) ABSTRACT

An umbrella repair assembly for reattaching a canopy of an umbrella to a rib of the umbrella includes a first shell that has a first slot integrated therein to accommodate a rib of an umbrella. A second shell is hingedly coupled to the first shell and the second shell is positionable in a closed position having the second shell abutting the first shell. The second shell has a second slot is integrated therein to accommodate the rib of an umbrella when the second shell is closed. In this way a canopy of the umbrella is compressed between the first shell and the second shell for reattaching the canopy to the rib.

1 Claim, 6 Drawing Sheets

US 11,278,091 B1

UMBRELLA REPAIR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to repair devices and more particularly pertains to a new repair device for reattaching a canopy of an umbrella to a rib of the umbrella.

(2) Description of Related Art Including Information Disclosed Under 37 CFR 1.97 and 1.98

The prior art relates to repair devices including a variety of repair devices for an umbrella that includes a sleeve that is positionable on a rib of an umbrella and a loop that is insertable into the sleeve to retain the sleeve on the rib. The prior art also discloses a variety of repair devices for an umbrella that includes a plug that is positionable on a rib of an umbrella and a cap that is positioned on the plug for reattaching a canopy to the rib.

BRIEF SUMMARY OF THE INVENTION

An embodiment of the disclosure meets the needs presented above by generally comprising a first shell that has a first slot integrated therein to accommodate a rib of an umbrella. A second shell is hingedly coupled to the first shell and the second shell is positionable in a closed position having the second shell abutting the first shell. The second shell has a second slot is integrated therein to accommodate the rib of an umbrella when the second shell is closed. In this way a canopy of the umbrella is compressed between the first shell and the second shell for reattaching the canopy to the rib.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
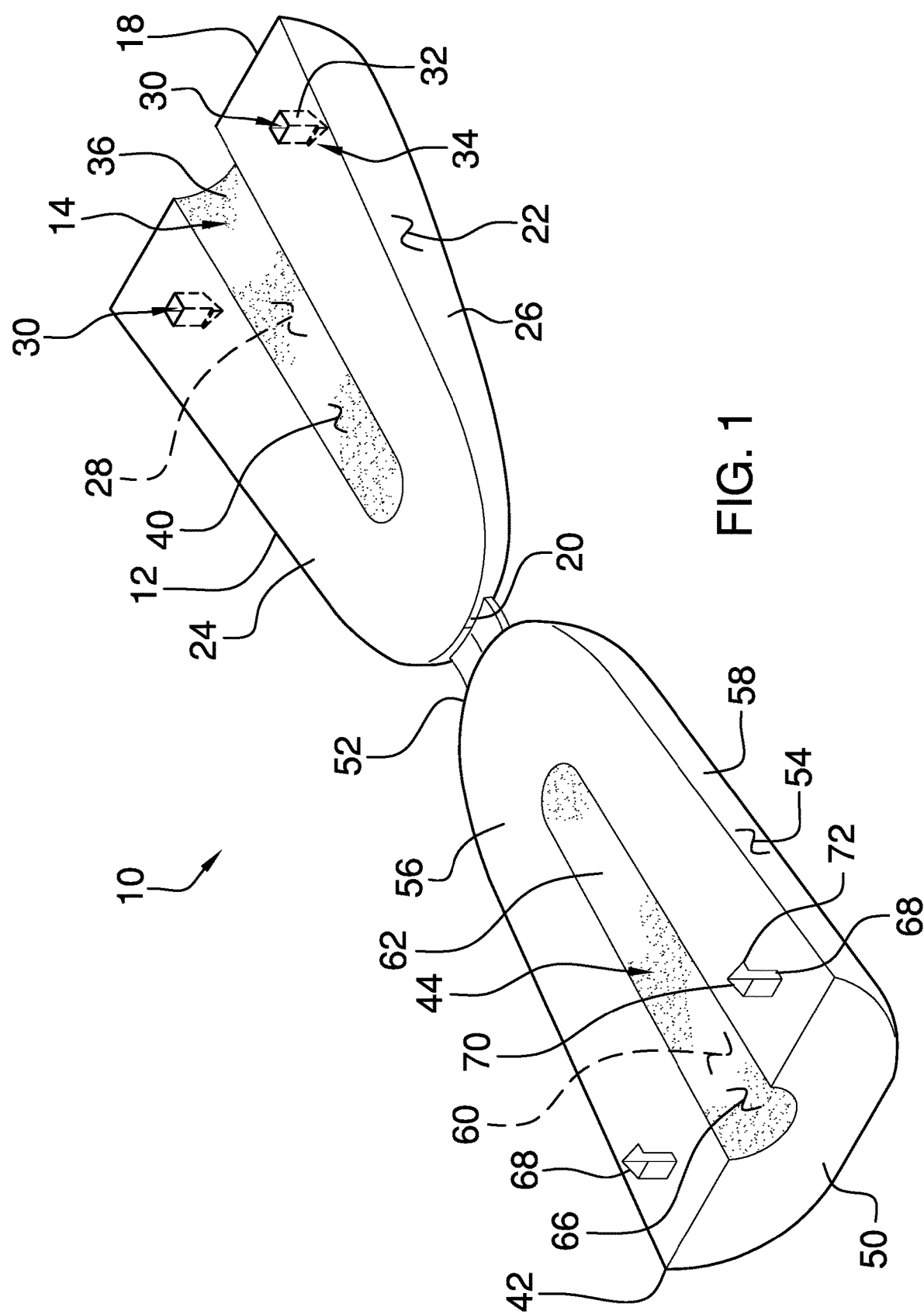
FIG. 1 is a perspective view of an umbrella repair assembly according to an embodiment of the disclosure.
Figure 2:
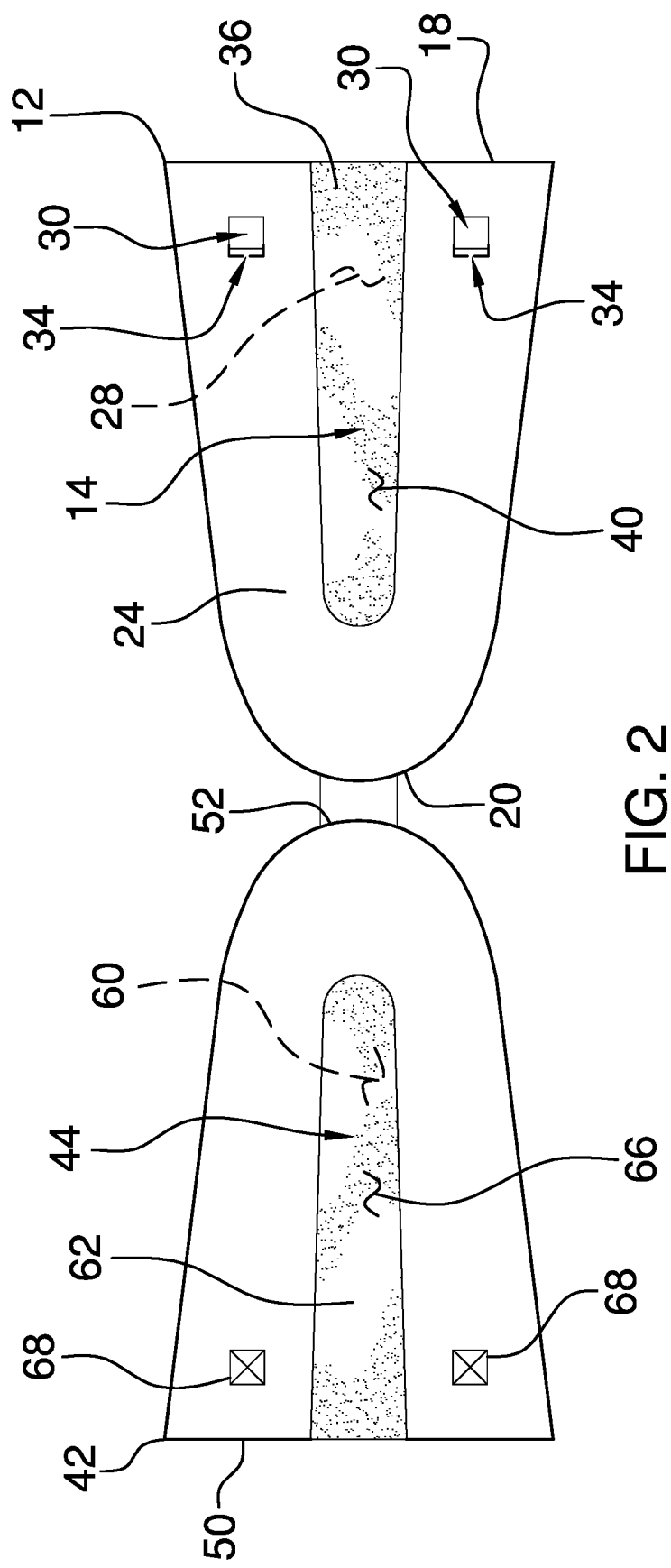
FIG. 2 is a top view of an embodiment of the disclosure.
Figure 3:
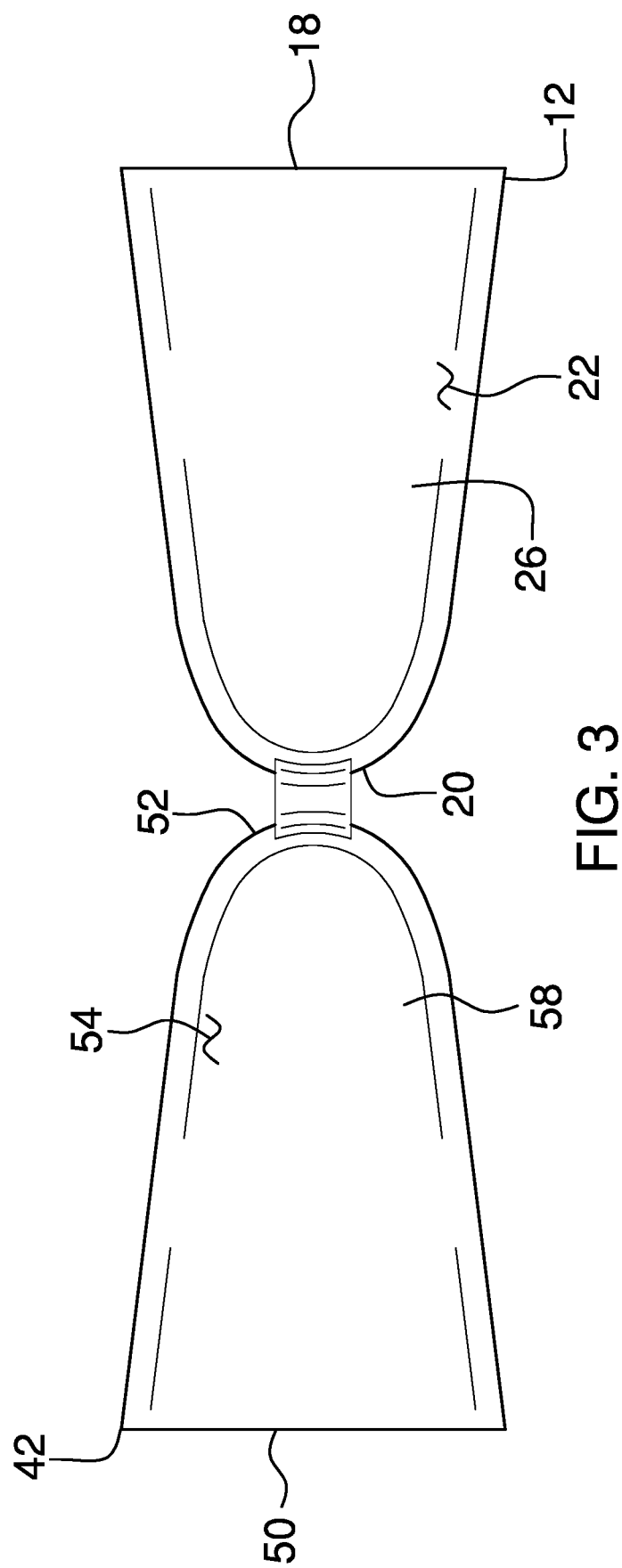
FIG. 3 is a bottom view of an embodiment of the disclosure.
Figure 4:
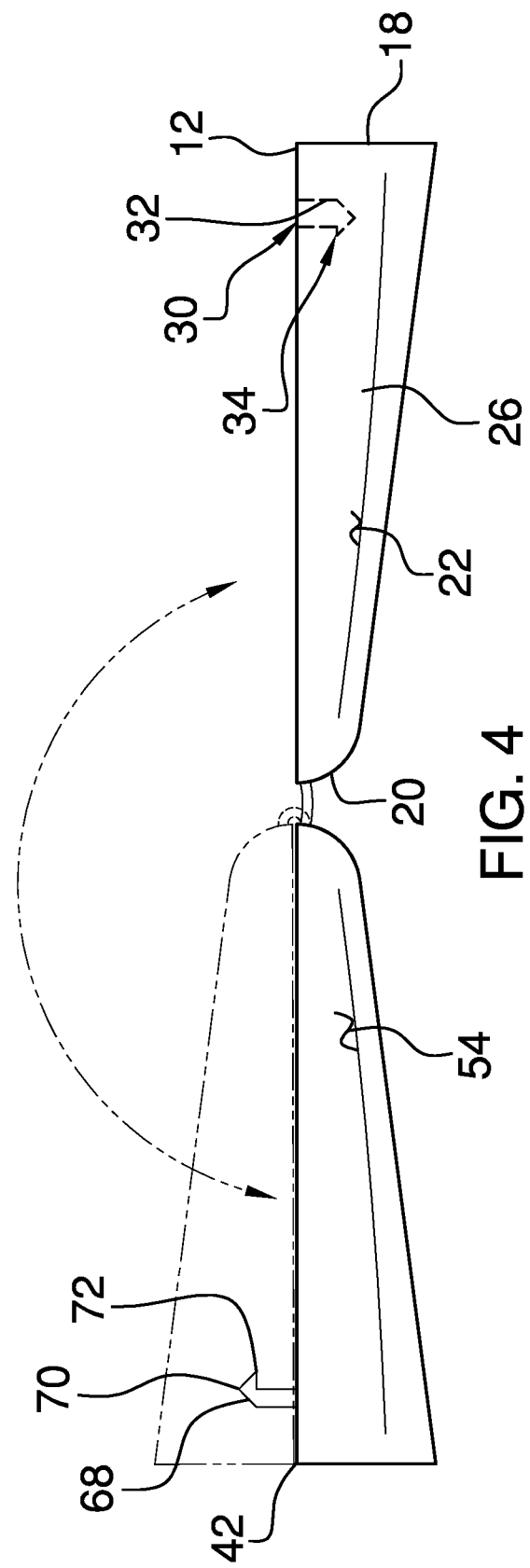
FIG. 4 is a right side view of an embodiment of the disclosure.
Figure 5:
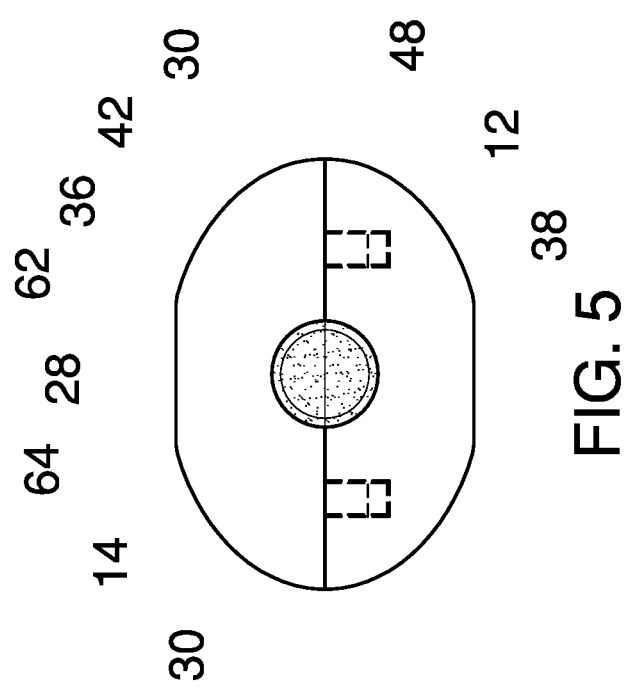
FIG. 5 is a front view of an embodiment of the disclosure showing a second shell in a closed position.
Figure 6:
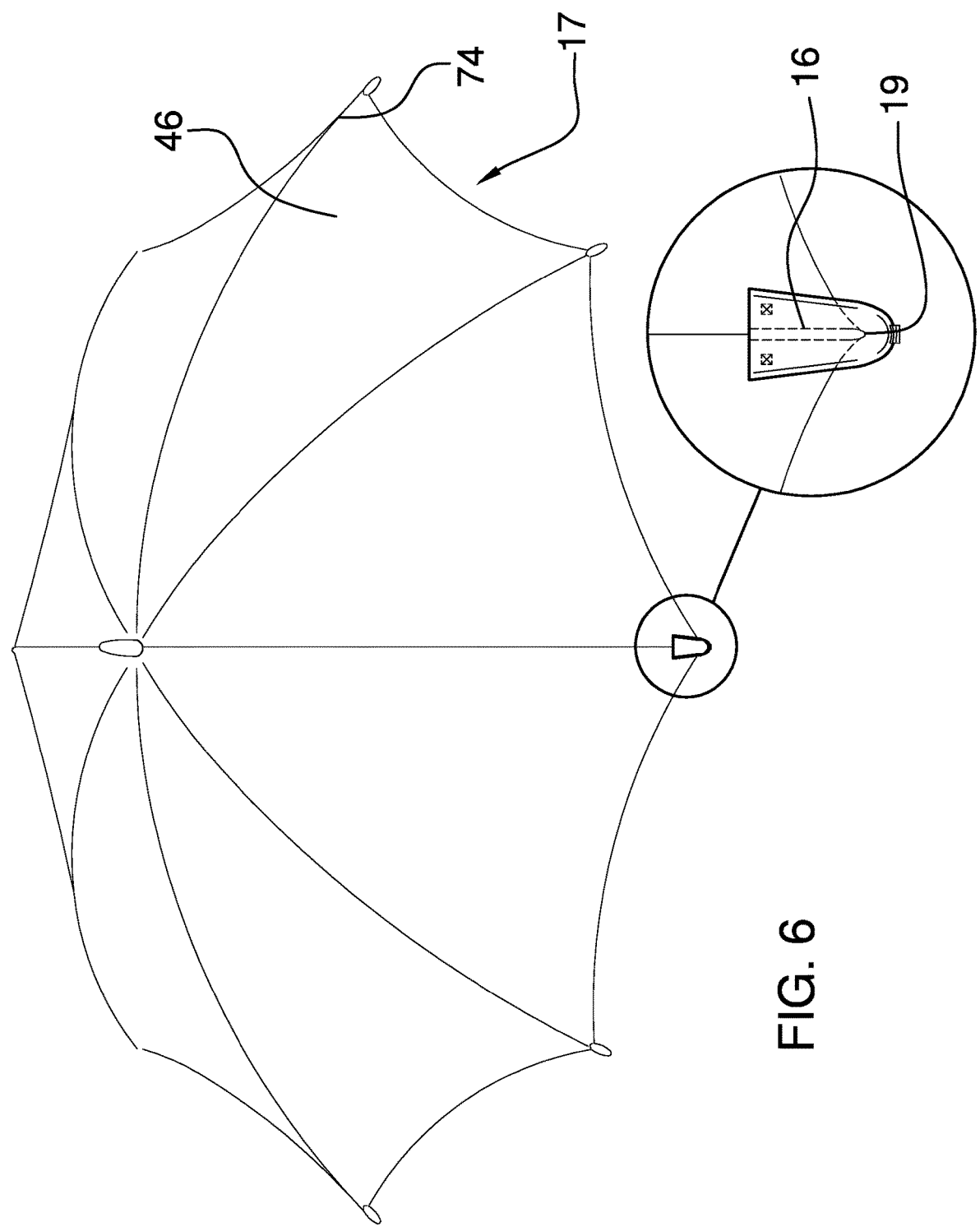
FIG. 6 is a perspective in-use view of an embodiment of the disclosure.

With reference now to the drawings, and in particular to FIGS. 1 through 6 thereof, a new repair device embodying the principles and concepts of an embodiment of the disclosure and generally designated by the reference numeral 10 will be described.

As best illustrated in FIGS. 1 through 6, the umbrella repair assembly 10 generally comprises a first shell 12 that has a first slot 14 integrated therein to accommodate a rib 16 of an umbrella 17 having a tip 19 of the rib 16 being positioned in the first slot 14. The first shell 12 has a first end 18, a second end 20 and an outer surface 22 extending therebetween, and the outer surface 22 has a top side 24 and a bottom side 26. The bottom side 26 is convexly arcuate with respect to the top side 24 and the top side 24 is planar. The first shell 12 may have a length of approximately 5.0 cm.

The first slot 14 extends into the top side 24 and the first slot 14 extends from the first end 18 toward the second end 20. The second end 20 is rounded to a blunt point and the first end 18 is flattened. The first slot 14 has a bounding surface 28 and the bounding surface 28 is concavely arcuate with respect to the top side 24. The top side 24 has a pair of wells 30 each extending toward the bottom side 26 and each of the wells 30 is positioned adjacent to the first end 18. Each of wells 30 is positioned on opposite sides of the first slot 14 with respect to each other. Additionally, each of the wells 30 has a bounding surface 32 and the bounding surface 32 of each of the wells 30 has a recess 34 therein.

A first adhesive layer 36 is positioned in the first slot 14 to adhesively engage the rib 16 for retaining the first shell 12 on the rib 16. The first adhesive layer 36 has a first surface 38 and a second surface 40. The first surface 38 is bonded to the bounding surface 32 of the first slot 14 such that the second surface 40 adhesively engages the rib 16. Additionally, the first adhesive layer 36 completely covers the bounding surface 32.

A second shell 42 is provided and the second shell 42 is hingedly coupled to the first shell 12. The second shell 42 is positionable in a closed position having the second shell 42 abutting the first shell 12. Conversely, the second shell 42 is positionable in an open position. The second shell 42 has a second slot 44 integrated therein to accommodate the rib 16 of the umbrella 17. Moreover, a tip 19 of the rib 16 is positioned in the second slot 44 when the second shell 42 is positioned in the closed position. The second slot 44 is aligned with the first slot 14 when the second shell 42 is in the closed position. In this way the first shell 12 and the second shell 42 enclose the rib 16 thereby facilitating a canopy 46 of the umbrella 17 to be compressed between the first shell 12 and the second shell 42 for reattaching the canopy 46 to the rib 16. A hole 48 formed by each of the first slot 14 and the second slot 44 may have a diameter ranging between approximately 2.4 mm and 2.8 mm.

The second shell 42 has a primary end 50, a secondary end 52 and an outer surface 54 extending therebetween. The outer surface 54 of the second shell 42 has an upper side 56 and a lower side 58. The lower side 58 is convexly arcuate with respect to the upper side 56 and the upper side 56 is planar. The second slot 44 extends into the upper side 56 and the second slot 44 extends from the primary end 50 toward the secondary end 52. The secondary end 52 is rounded to a blunt point and the primary end 50 is flattened. Additionally, the second slot 44 has a bounding surface 60 and the bounding surface 60 of the second slot 44 is concavely arcuate with respect to the upper side 56.

A second adhesive layer 62 is positioned in the second slot 44 and the second adhesive layer 62 adhesively engages the rib 16 for retaining the second shell 42 on the rib 16. The second adhesive layer 62 has a first surface 64 and a second surface 66, and the first surface 64 of the second adhesive layer 62 is bonded to the bounding surface 60 of the second slot 44. In this way the second surface 66 of the second adhesive layer 62 adhesively engages the rib 16 when the second shell 42 is in the closed position. Moreover, the second adhesive layer 62 completely covers the bounding surface 60 of the second slot 44.

A pair of tabs 68 is each coupled to and extends away from the upper side 56 of the outer surface 22 of the second shell 42. Each of the tabs 68 is positioned adjacent to the primary end 50 and each of the tabs 68 is positioned on opposite sides of the second slot 44 with respect to each other. Additionally, each of the tabs 68 has a distal end 70 and each of the tabs 68 has an engagement 72 extending laterally away therefrom. The engagement 72 on a respective one of the tabs 68 is aligned with the distal end 70 of the respective tab. Each of the tabs 68 extends into a respective one of the wells 30 in the top side 24 of the outer surface 22 of the first shell 12 when the second shell 42 is positioned in the closed position. Moreover, the engagement 72 on each of the tabs 68 engages the recess 34 in the bounding surface 32 of the respective well 30 for retaining the second shell 42 in the closed position. In this way the first shell 12 and the second shell 42 reattach the canopy 46 to the rib 16.

In use, the first shell 12 is positioned on a bottom 74 of the rib 16 of the umbrella 17 and the canopy 46 is stretched over the top side 24 of the outer surface 22 of the first shell 12. The second shell 42 is positioned in the closed position to surround the rib 16 and to compress the canopy 46 between the first shell 12 and the second shell 42. In this way the canopy 46 can be re-attached to the rib 16 of an umbrella 17 when the canopy becomes separated. Each of the ribs 16 of the umbrella 17 can have a respective pair of the first shell 12 and second shell 42 positioned thereon for completely re-attaching the canopy 46 to the ribs 16. In this way a person with limited skill and limited tools can repair the umbrella 17.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An umbrella repair assembly for reattaching a canopy of an umbrella to ribs of the umbrella, said assembly comprising:
    a first shell having a first slot being integrated therein wherein said first slot is configured to accommodate a rib of an umbrella having a tip of the rib being positioned in said first slot, said first shell having a first end, a second end and an outer surface extending therebetween, said outer surface having a top side and a bottom side, said bottom side being convexly arcuate with respect to said top side, said top side being planar, said first slot extending into said top side, said first slot extending from said first end toward said second end, said second end being rounded to a blunt point, said first end being flattened, said first slot having a bounding surface, said bounding surface being concavely arcuate with respect to said top side, said top side having a pair of wells each extending toward said bottom side, each of said wells being positioned adjacent to said first end, each of wells being positioned on opposite sides of said first slot with respect to each other, each of said wells having a bounding surface, said bounding surface of each of said wells having a recess therein;
    a first adhesive layer being positioned in said first slot wherein said first adhesive layer is configured to adhesively engage the rib for retaining said first shell on the rib, said first adhesive layer having a first surface and a second surface, said first surface being bonded to said bounding surface of said first slot wherein said second surface is configured to adhesively engage the rib, said first adhesive layer completely covering said bounding surface;
    a second shell being hingedly coupled to said first shell, said second shell being positionable in a closed position having said second shell abutting said first shell, said second shell being positionable in an open position, said second shell having a second slot being integrated therein wherein said second slot is configured to accommodate the rib of an umbrella having a tip of the rib being positioned in said second slot when said second shell is positioned in said closed position, said second slot being aligned with said first slot when said second shell is in said closed position wherein said first shell and said second shell are configured to enclose the rib thereby facilitating a canopy of the umbrella to be compressed between said first shell and said second shell for reattaching the canopy to the rib, said second shell having a primary end, a secondary end and an outer surface extending therebetween, said outer surface of said second shell having an upper side and a lower side, said lower side being convexly arcuate with respect to said upper side, said upper side being planar, said second slot extending into said upper side, said second slot extending from said primary end toward said secondary end, said secondary end being rounded to a blunt point, said primary end being flattened, said second slot having a bounding surface, said bounding surface of said second slot being concavely arcuate with respect to said upper side;

a second adhesive layer being positioned in said second slot wherein said second adhesive layer is configured to adhesively engage the rib for retaining said second shell on the rib, said second adhesive layer having a first surface and a second surface, said first surface of said second adhesive layer being bonded to said bounding surface of said second slot wherein said second surface of said second adhesive layer is configured to adhesively engage the rib, said second adhesive layer completely covering said bounding surface of said second slot; and a pair of tabs, each of said tabs being coupled to and extending away from said upper side of said outer surface of said second shell, each of said tabs being positioned adjacent to said primary end, each of said tabs being positioned on opposite sides of said second slot with respect to each other, each of said tabs having a distal end, each of said tabs having an engagement extending laterally away therefrom, said engagement on a respective one of said tabs being aligned with said distal end of said respective tab, each of said tabs extending into a respective one of said wells in said top side of said outer surface of said first shell when said second shell is positioned in said closed position, said engagement on each of said tabs engaging said recess in said bounding surface of said respective well for retaining said second shell in said closed position wherein said first shell and said second shell are configured to reattach the canopy to the rib.

* * * * *